United States Patent [19]
Coleman et al.

[11] Patent Number: 6,079,827
[45] Date of Patent: Jun. 27, 2000

[54] METHOD FOR TANDEM EDGING COMPLEMENTARY LENSES

[75] Inventors: Charles R. Coleman, Pittsburgh; Bennett A. R. Smith, Jr., Irwin, both of Pa.

[73] Assignee: PPG Industries Ohio, Inc., Cleveland, Ohio

[21] Appl. No.: 09/157,485

[22] Filed: Sep. 21, 1998

[51] Int. Cl.[7] ..................................................... G02C 7/02
[52] U.S. Cl. ............................................ 351/177; 351/159
[58] Field of Search ...................................... 351/159, 177, 351/178, 172

[56] References Cited

U.S. PATENT DOCUMENTS

| | | | |
|---|---|---|---|
| 4,179,851 | 12/1979 | Neisler et al. ....................... | 51/101 LG |
| 4,279,474 | 7/1981 | Belgorod ................................. | 359/265 |
| 4,287,018 | 9/1981 | Gulati et al. ............................ | 156/645 |
| 4,498,919 | 2/1985 | Mann ..................................... | 65/30.11 |
| 5,327,281 | 7/1994 | Cogan et al. ........................... | 359/270 |
| 5,399,227 | 3/1995 | Abrams .................................. | 156/539 |
| 5,618,390 | 4/1997 | Yu et al. ............................ | 204/192.26 |
| 5,916,398 | 6/1999 | Coleman et al. ........................ | 156/228 |
| 5,953,150 | 9/1999 | Smarto et al. .......................... | 359/265 |

*Primary Examiner*—Scott J. Sugarman
*Attorney, Agent, or Firm*—William C. Mitchell

[57] ABSTRACT

A method for simultaneously edging a complementary pair of ophthalmic lenses is disclosed. In this method, 1) the lenses to be edged are stacked or temporarily bonded; 2) the stacked or temporarily bonded lenses are simultaneously edged; and 3) the edged lenses are separated. Laminated devices prepared using lenses edge via this method are also disclosed.

20 Claims, 2 Drawing Sheets

METHOD FOR TANDEM EDGING COMPLEMENTARY LENSES

FIELD OF THE INVENTION

This invention is directed to a novel method for simultaneously edging a complementary pair of ophthalmic lenses, particularly a lens pair used to prepare a laminated electrochromic lens, and to laminated lenses prepared using such simultaneously edged lenses.

BACKGROUND OF THE ART

The art of preparing ophthalmic lenses from glass or plastic blanks entails edging blank lenses. Edging means that an ophthalmic lens is ground to a desired peripheral shape to fit a preselected frame. Additionally, during edging, the peripheral edge surface of a given lens may be beveled or otherwise profiled to cooperate with a reciprocal shape or an interior peripheral surface of a frame in order to hold the lens within the frame, to align with or support an edge seal applied to the lens, or for other purposes. Techniques and devices for edging ophthalmic lenses are well known in the art. See, for example, U.S. Pat. No. 4,179,851.

The formation of a composite eyeglass lens by bonding front and rear lenses together is also known. See, for example, U.S. Pat. No. 5,399,227. The '227 bonding process involves placing an adhesive on the concave surface of a first lens, pressing the convex surface of a second lens against the adhesive on the front lens to evenly spread the adhesive between the lenses and curing the adhesive to bond the lenses together. This process forms a composite lens which is then edged to fit within an eyeglass frame and which may be further processed if desired. U.S. Pat. No. 4,287,018 discloses a method for edging glass-plastic laminated lenses at elevated temperature. In this method, edging occurs after lamination.

Recently, laminated electrochromic lenses have been described. These lenses comprise bonded first and second complementary lenses and at least one thin film of a persistent electrochromic material, i.e., a material which, in response to application of an electric field of given polarity, changes from a high-transmittance, non-absorbing state to a low-transmittance, absorbing or reflecting state. The first and second lenses are complementary in that their mating surfaces are sized and shaped so that, absent alignment problems, spacing between the lenses after lamination is substantially uniform.

Since the degree of optical modulation is directly proportional to the current flow induced by the applied voltage, electrochromic lenses demonstrate light transmission tunability between high-transmittance and low-transmittance states. In addition, these lenses exhibit long-term retention of a chosen optical state, requiring no power consumption to maintain that optical state. Optical switching occurs when an electric field of reversed polarity is applied.

To facilitate the required ion and electron flows, an electrochromic film, which is both an ionic and electronic conductor, is in ion-conductive contact, preferably direct physical contact, with an ion-conducting material layer. The ion-conducting material may be inorganic or organic, solid, liquid or gel, and is preferably an organic polymer which also serves as a laminating agent. The electrochromic film(s) and ion-conductive material are disposed between two electrodes, which in turn are disposed between two lenses, forming a laminated cell.

When the electrode adjacent to the electrochromic film is the cathode, application of an electric field causes darkening of a cathodically-coloring film. Reversing the polarity causes electrochromic switching, and the film reverts to its high-transmittance state. Typically, an electrochromic film such as tungsten oxide is deposited on an ophthalmic lens coated with an electroconductive film such as tin oxide or indium tin oxide to form one electrode. The counter electrode is typically a similar tin oxide or indium tin oxide coated ophthalmic lens.

As voltage is applied across the electrodes, ions are conducted through the ion-conducting material. To ensure reliable operation, the ion-conducting material layer generally must be sealed so as to maintain its water content within a range sufficient to provide required ion conductivity. Absent an adequate seal, moisture loss or gain through the exposed edge of the ion-conducting material layer impacts performance. The peripheral edge surface of a laminated device may be shaped to support or interlock with an edge seal. For example, copending U.S. patent application Ser. No. 08/996,064, filed Dec. 22, 1997, discloses a nubbed-edge design that facilitates application of an edge seal to the peripheral edge surface of an electrochromic device. Because such nubs preferably comprise a raised portion of each of the lenses forming the laminate, accurate edging is essential.

A typical laminated electrochromic lens comprises a first electroconductive material layer which serves as a first electrode, an electrochromic layer, an ion-conducting material layer and a second electroconductive layer which serves as a second electrode. Preferably, a complementary electrochromic layer is also used. These electroconductive and electrochromic layers, along with the ion-conducting material layer, can be arranged as a single stack deposited on a first lens which is then laminated to a second lens, or they can be arranged such that the electrodes are coated on separate lenses, followed by placement on the lenses of one or more electrochromic layers. The coated lenses are then laminated via a technique which positions an ion-conducting material between the coated lenses. Preferably, an ion-conducting polymer, which also serves as a bonding agent, is used to bond the complementary lenses.

SUMMARY OF THE INVENTION

Figure 1:
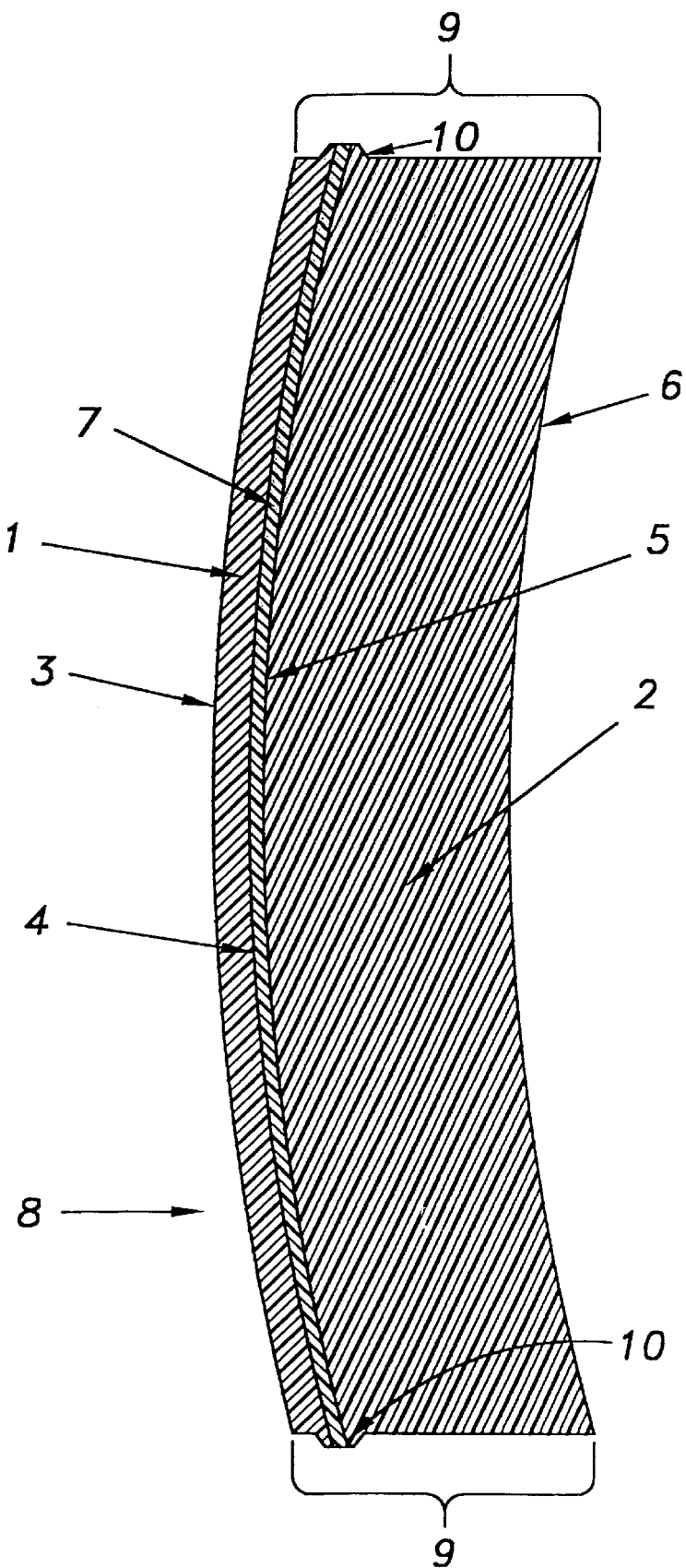
FIG. 1 is a cross sectional side view of a laminated lens showing the profile of a peripheral nub at the interface of the lenses forming the laminate.

A complete understanding of the instant invention will be obtained from the following description taken in connection with the accompanying drawings, wherein like reference characters identify like parts throughout.

In the Figures, laminated ophthalmic lens 8 comprises first or front lens 1, second or rear lens 2 and bonding layer 7. Common lamination terminology designates the front surface 3 of first or front lens 1 as the S1 surface. Rear surface 4 of lens 1 is the S2 surface. Likewise, front surface 5 of second or rear lens 2 is the S3 surface, and rear surface 6 of lens 2 is the S4 surface. The S2 and S3 surfaces of complementary lenses 1 and 2 are the mating surfaces, i.e., the surfaces which are bonded to form a laminate, while the S1 and S4 surfaces are the optical surfaces. Laminated ophthalmic lens 8 is prepared by bonding front and rear lenses 1 and 2, respectively, using bonding agent 7. The overall surface area of laminated lens 8 comprises front optical surface S1, rear optical surface S4 and peripheral edge surface 9 between the S1 and S4 optical surfaces. Peripheral edge surface 9 of laminated lens 8 comprises the peripheral edge surface of front lens 1, the peripheral edge surface of the rear lens 2, and the peripheral edge surface of bonding layer 7.

In accordance with the present invention, the peripheral edge surfaces of lenses 1 and 2 are simultaneously edged by means of grinding wheel 11 to form complementary half nubs on the peripheral edge surface of each of the lenses. Edging occurs while the mating surfaces of lenses 1 and 2 are coupled, but not permanently bonded (i.e., before lamination). As used herein, the term "coupled" means that the mating surfaces of complementary lenses are in close proximity with each other or joined in a manner which permits simultaneous edging of the lenses. Stacking is a suitable option. Also, temporary bonding agents can be used.

The instant pre-lamination edging method can be used to produce individual lenses having corresponding edge profiles which align to form a desired edge profile on a laminated lens prepared by bonding the individual lenses. Thus, lens 8 contains nub 10, which comprises the complementary half nubs formed during the simultaneous edging step. Nub 10 can be used to interlock with an edge seal (not shown) used to seal the peripheral edge surface of bonding layer 7. Pre-lamination edging is necessary when the peripheral edge surfaces of the lenses to be laminated contain one or more films or coatings. For example, a typical peripheral edge surface of a lens used to prepare a laminated electrochromic device may contain an electroconductive film and a bus bar.

In general terms, the instant invention is directed to a method for simultaneously edging a pair of complementary lenses prior to lamination, which method comprises: (a) stacking or coupling complementary ophthalmic lenses, with or without the use of a temporary bonding agent; b) simultaneously edging the stacked or coupled lenses of step a); and c) separating the edged lenses. A laminated lens can then be prepared by permanently bonding the edged complementary lenses of step b) to form a laminate. For laminated electrochromic lenses, bus bars and appropriate films are also applied to the lenses prior to lamination.

Although complementary lenses can be edged separately prior to lamination, accuracy is generally a concern. The instant method allows highly accurate positioning and shaping of surface features on the peripheral edge surfaces of complementary lenses 1 and 2, such as the raised portions comprising peripheral nub 10. Also, in cases where a thin (e.g., less than about 2 mm thick) lens is laminated to a thicker (e.g., at least about 2 mm thick) lens, mating surface contact of the lenses during edging reduces distortion of the thin lens by spreading the load of an edging wheel or cutter blade over both lenses.

DETAILED DESCRIPTION OF THE INVENTION

Other than in the operating Examples, or where otherwise indicated, all numbers quantifying ingredients, amounts, dimensions, ratios, ranges, reaction conditions, etc., used herein are to be understood as modified in all instances by the term "about".

In one embodiment, the instant invention is directed to an edged, laminated lens comprising first and second complementary lenses and a bonding agent used to laminate said first and second lenses, wherein the first and second lenses were simultaneously edged while their mating surfaces were coupled prior to lamination. Simultaneous edging can occur with or without temporary bonding.

The instant invention is also directed to a laminated electrochromic lens comprising:

a. a first edged ophthalmic lens having a mating surface, preferably an edged transparent polymeric lens, said edged lens optionally containing a primer which improves the adherence thereto of an electroconductive film;

b. a first electroconductive film, preferably a metal oxide film, deposited on the mating surface of said first edged lens or on a primer deposited thereon;

c. a first electrochromic film deposited on said first electroconductive film;

d. a second edged ophthalmic lens having a mating surface, preferably an edged transparent polymeric lens, said edged lens optionally containing a primer which improves the adherence thereto of an electroconductive film;

e. a second electroconductive film, preferably a metal oxide film, deposited on the mating surface of said second edged lens, on a primer deposited thereon or on a film or layer deposited directly or indirectly on said first edged lens;

f. optionally, a second complementary electrochromic film deposited directly or indirectly on said second electroconductive film; and g. an ion-conducting polymer disposed between said first and second edged lenses;

wherein said first and second edged lenses are simultaneously edged prior to lamination while they are coupled or stacked so that their mating surfaces are engaged and/or in contact with each other, with or without temporary bonding.

The present invention is also directed to a method for simultaneously edging complementary first and second ophthalmic lenses, each having a mating surface and an optical surface, which method comprises: a) stacking, positioning or coupling said first and second lenses so as to place their mating surfaces in contact or in close proximity with each other, with or without temporarily bonding the mating surfaces of said first and second lenses; and b) simultaneously edging said first and second lenses while they are stacked, positioned, coupled or temporarily bonded. Coupling or stacking can be accomplished via any conventional coupling or stacking technique, including manual techniques. Temporary bonding can be accomplished by applying an effective amount of a temporary bonding agent to one or both of the mating surfaces of the lenses to be edged. Conventional application techniques can be used.

After simultaneous edging, edged lenses are separated via any suitable separation technique; they then can be subjected to further processing/treatment and laminated by any suitable lamination means to form a laminate. Preferably, the first lens is a thin lens having a thickness of less than about 2 mm, more preferably having a thickness of about 1 mm, and the second lens is of sufficient thickness to substantially reduce distortion of said first lens due to contact with a grinding/shaving device such as a grinding wheel or cutter blade. For example, a first lens having a thickness of at least about 1 mm can be used with a second thicker lens, e.g., a lens having a thickness of at least about 5 mm. After edging, appropriate films (e.g. electroconductive and electrochromic films) can be applied to the complementary first and second lenses, which can then be bonded, preferably using an ion-conducting polymer, to form a laminated electrochromic eyewear lens.

Though the instant method is particularly useful for edging two complementary lenses, it is not limited to the simultaneous edging of two (2) lenses. Multiple complementary lenses can be stacked, coupled or temporarily bonded and simultaneously edged in accordance with this invention. Thus, the instant invention is also directed to a method for simultaneously edging a plurality of complementary lenses which comprises stacking, coupling or temporarily bonding said lenses so as to align their complementary surfaces and simultaneously edging the lenses using an edging means designed to provide the desired shape to each of the lenses being edged.

In another embodiment, the instant invention is directed to a method for edging a thin lens, i.e., a lens less than about 2 mm thick, which comprises: a) supporting said thin lens with a supporting substrate (with or without temporary bonding of said thin lens to said supporting substrate), such as a second lens having a thickness of at least about 2 mm; b) edging the thin lens while it is supported by or temporarily bonded to said supporting substrate; and c) separating or removing the edged thin lens from the supporting substrate.

If the lenses to be edged are stacked or coupled without applying a temporary bonding agent to one or both of their mating surfaces, the pressure of an edger support means is generally sufficient to hold the lenses together during edging. If a temporary bonding agent is used, complementary lenses can be temporarily bonded via any suitable means. For example, an effective amount of bees wax, toluene, saliva or water can be placed on either or both of the mating surfaces to be temporarily bonded via any suitable application means. Vacuum or double-faced tape can also be used. Water is a preferred temporary bonding agent. Edging can then be accomplished via any conventional lens shaping/edging technique. For example wet and dry edging techniques are suitable. Edging wheels for wet edging processes and edging blades for dry edging processes are commercially available. Such wheels and blades are generally custom shaped to provide the desired lens profile. Dry tandem stacking (i.e., without use of a temporary bonding agent) is preferred for dry edging processes.

Laminated electrochromic lenses preferably contain an ion-conducting polymer layer disposed between the mating surfaces of the first and second coated lenses. Various ion-conducting polymers can be used. Preferred ion-conducting polymers serve both as ion-conducting electrolytes and mechanical adhesives. Suitable ion-conducting polymers include the polymers known as ionomers described in U.S. Pat. No. 5,327,281 to Cogan and Rauh, which is incorporated herein by reference in its entirety. These polymers are generally formed by casting and polymerizing solutions containing monomers bearing both an ionizable group and an ethylenic, e.g. vinylic, group in situ, i.e., between the coated substrates of an electrochromic device, though this invention is not limited to this embodiment. Polymers containing sulfonic acid moieties are particularly useful as ion-conducting polymers.

Preferred polymers are proton-conducting polymers selected from the group consisting of homopolymers of 2-acrylamido-2-methylpropanesulfonic acid (AMPSA) and copolymers of AMPSA with various monomers, for example N,N-dialkyl(meth)acrylamides. Such polymers may be formed using reaction mixtures of monomers which are cast and cured in place between the coated substrates of an electrochromic device. A more preferred proton-conducting polymer electrolyte in accordance with the present invention is a copolymer of AMPSA and N,N-dimethylacrylamide (DMA). The thickness of the ion-conducting polymer layer is not believed to be critical but in general is in the range of 0.001 to 0.025 inch (0.0254 to 0.625 millimeter).

Cast-in-place methods of lamination are known in the art. A preferred method for laminating edged electrochromic lenses is the suspension lamination technique disclosed in copending U.S. patent application Ser. No. 08/970,031 to Coleman, Backfisch and Smarto. In this method, ion-conducting polymers are formed in situ between the electrodes of electrochromic devices by depositing a polymerizable monomer solution comprising one or more monomers and an initiator onto one of the electrodes, distributing the monomer solution between the electrodes by bringing them together, and exposing the initiator in the monomer solution to an energy source, thereby initiating polymerization of the monomer solution.

The first and second lenses of the instant invention can be of any suitable material. Preferred lenses are prepared from light transmitting materials such as glass or plastic. Suitable transparent lenses may have a conventional refractive index (1.48–1.5), a relatively high refractive index (1.60–1.75), or a mid-range refractive index (1.51–1.59), depending on the end use. In general terms, a transparent lens may have a refractive index within the range of between 1.48 and 1.8.

Synthetic polymer substrates that may be used as a lens material include, but are not limited to: thermoplastic polycarbonates, such as the carbonate-linked resin derived from bisphenol A and phosgene, which is sold under the trademark LEXAN; polyesters, such as the material sold under the trademark, MYLAR; poly(methylmethacrylates), such as the material sold under the trademark, PLEXIGLAS; and polymerizates of a polyol(allyl carbonate) monomer, especially diethylene glycol bis(allyl carbonate), which is sold under the trademark CR-39®. Copolymers of the aforedescribed monomers/resins may also be used as a lens material. These and other transparent and non-transparent polymeric substrates known in the art for various optical and non-optical applications may be used.

To prepare a laminated electrochromic lens, first and second lenses are simultaneously edged using the instant method. A cathodically coloring electrochromic material, for example tungsten oxide or compounds thereof, is deposited at a thickness of about 800 to 5,000 Angstroms on one of the edged lenses after it has been coated with a transparent electroconductive metal oxide film, such as tin oxide or indium tin oxide (ITO). This combination serves as one electrode. Preferably, the electroconductive film comprises indium and tin at a weight ratio of about 90:10. The electroconductive film thickness is preferably in the range of about 800 to 5,000 Angstroms for acceptable conductivity. The electroconductive and electrochromic films may be deposited by a variety of methods so long as the substrate is not deleteriously affected. The adhesion of an electroconductive metal oxide film directly to a plastic lens may be improved by application of a primer, such as an organo silane hardcoat, to said substrate prior to coating. For a more detailed discussion of electrochromic films, electroconductive films and the use thereof to prepare electrochromic devices, see U.S. Pat. No. 5,618,390 to Yu, Backfisch, et al.

The counter electrode is then prepared by depositing a similar metal oxide (e.g., indium tin oxide) coating on the second edged lens, with or without a complementary electrochromic film. A suitable complementary electrochromic film is a nitrogen-containing iridium oxide film, as disclosed in U.S. Pat. No. 5,618,390 to Yu, Backfisch, et al. The ion conducting polymer is then disposed between coated and edged lenses and cured to form a laminated lens. Lamination is preferably accomplished by placing an effective amount of a curable ion-conducting polymer (ICP) composition, i.e. a monomer solution comprising one or more monomers, an effective amount of 2,4,6-trimethylbenzoyldiphenyl phosphine oxide or other suitable initiator and optionally up to one or more non-reactive diluents and/or additives, on the concave mating surface of a complementary pair of edged lenses and moving this concave surface and the convex surface of the corresponding lens toward each other, thereby spreading the curable adhesive composition between the lenses. The curable ICP composition can then be cured in situ by exposing the mated lenses to a source of energy, e.g., visible light, which preferably passes through at least one of the coated lenses. Curing of the polymer forms an ion-conducting polymer layer between the lenses while bonding the lenses into a laminate, thereby facilitating necessary ion flow in the laminated electrochromic lens.

EXAMPLES

The following examples are presented for illustrative purposes only and are not intended to limit the invention in any way.

Example 1

Simultaneous Edging of Complementary Lenses With Temporary Bonding

Figure 2:
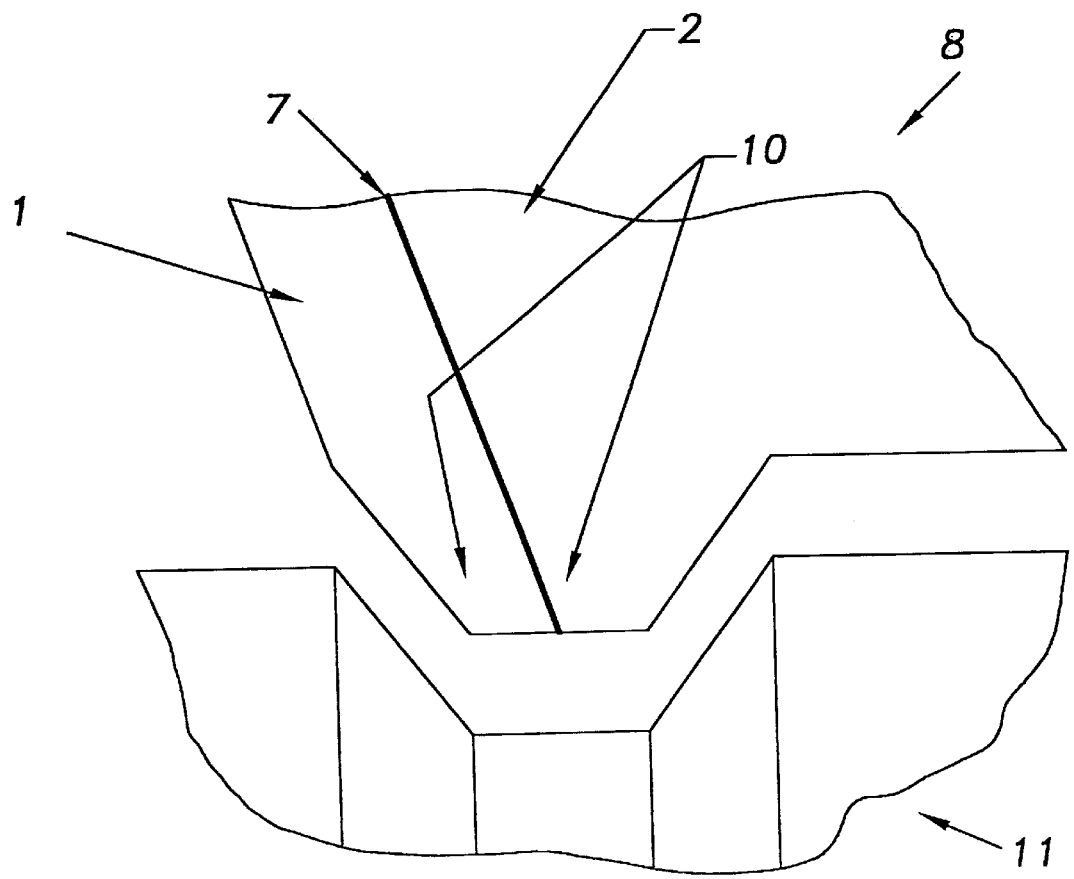
FIG. 2 is a partial cross-sectional view of a grinding wheel, with corresponding edged, temporarily bonded complementary lenses.

Complementary 1 mm thick plano and 10 mm thick semi-finished lenses prepared from CR-39® monomer were temporarily bonded and simultaneously edged via the following method:

1. Using a template, the optical center of the plano lens was marked on its convex S1 surface.
2. A thermoplastic lens block (model number 20033 commercially available from Gerber Optical, Inc.) was attached to the S1 surface of the plano lens using a Gerber Optical Step Two finish blocker. The lens block was applied at the optical center.
3. The S2 concave surface of the plano lens and the S3 convex surface of the semi-finished lens were cleaned.
4. About 0.25 ml of water was placed on the convex S3 surface of the semi-finished lens using an eye dropper.
5. The S2 surface of the plano lens was placed over the S3 surface of the semi-finished lens; slight pressure caused the water to spread between the lenses. The capillary action and/or surface tension of the water temporarily bonded the lenses together.
6. The temporarily bonded lens stack was placed into an Elite-EFS Finish Edger, available from Gerber Optical, equipped with a chuck compatible with the lens block affixed to the S1 plano surface.
7. Edging was accomplished using a roughing wheel, followed by a finish wheel. The edging step formed complementary half nubs on each lens, similar to those shown in FIG. 2.
8. After edging, the lenses were easily separated by hand, and the lens block was removed by flexing the plano lens.

This tandem edging technique provided fine edge bevel detail and accurate nub placement, while providing consistent lens to lens size reproducibility and reducing interface surface defects.

Example 2

Simultaneous Edging Using Dry Tandem Stacking

Complementary 1 mm thick plano and 10 mm thick semi-finished lenses prepared from CR-39® monomer were simultaneously edged via the following method:

1. Using a template, the optical center of the plano lens was marked on its convex S1 surface.
2. A 3M LEAP™ pad was affixed to the plano S1 convex optical center.
3. A 3M LEAP™ metal base finish block was manually affixed to the 3M LEAP™ pad affixed to the plano S1 convex optical center.

(or)

2a, 3a A 3M LEAP™ pad and 3M LEAP™ metal base finish block was affixed mechanically to the S1 convex optical center of the plano by means of a WECO CAD Finish Blocker.
4. The S2 concave surface of the plano lens and the S3 convex surface of the semi-finish lens were cleaned.
5. The S2 surface of the plano lens was placed over the S3 surface of the semi-finish lens; slight pressure on the plano metal base finish block provided a bonding action between the complementary mating surfaces.
6. The lens stack of step 5 was placed into a Horizon III Lens Finish Edger, available from National Optronics, equipped with a chuck compatible with the lens block affixed to the S1 plano surface.
7. Edging was accomplished using a cutting blade comprising both rough cut and finish bevel areas. The edging step formed complementary nub halves on each lens, similar to those shown in FIG. 2.
8. After edging, the lens was separated by directing a continuous flow of pressurized house-air at the split line between the lenses.
9. The 3M LEAP™ metal base finish block was removed from the S1 convex plano surface by using a hand blocker for LEAP™ systems or by means of pliers. The 3M LEAP™ pad was removed manually.

This tandem edging technique improved fine edge bevel detail and nub placement, while providing consistent lens to lens size repeatability with no interface surface defects.

Example 3

Preparation of a Laminated Electrochromic Lens

The edged lenses of Example 1 were cleaned and dried using an ultrasonic cleaning system. After these steps, a chrome-gold bus bar was applied to each of the half nubs via a vacuum deposition technique.

Thin films of $In_2O_3$:$SnO_2$ (ITO) were then deposited onto the S2 and S3 mating surfaces of the nubbed plastic lenses using direct current (dc) magnetron sputtering so as to contact ITO with each of the bus bars. A thin metal strip was then affixed to each bus bar using a conductive epoxy. These strips served as electrical connectors.

Electrochromic layers were separately deposited onto the respective ITO coated plastic lenses. A tungsten oxide thin film was deposited on the plano lens by direct current magnetron sputtering, and a nitrogen-containing iridium oxide thin film was deposited on the semi-finished lens by direct current magnetron sputtering.

Following these depositions, the IrOxNy/ITO/primer/polymer lens was electrochemically charged (reduced) in 0.1 normal aqueous hydrochloric acid. The $WO_3$/ITO/primer/polymer substrate was not electrochemically treated.

An ion-conducting polymer monomer solution comprising 2-acrylamido-2-methylpropanesulfonic acid (AMPSA) and N,N-dimethylacrylamide (DMA) in 1-methyl-2-pyrrolidinone (NMP) and water and containing an effective amount of a photoinitiator was prepared. This precursor was placed between the WO$_3$ and nitrogen-containing iridium oxide half cells and then exposed to suitable energy to cure the ion-conducting polymer, resulting in a laminated electrochromic device having a circumferential nub contiguous with the ICP layer.

It is evident from the foregoing that various modifications, which are apparent to those skilled in the art, can be made to the embodiments of this invention without departing from the spirit or scope thereof. Having thus described the invention, it is claimed as follows.

We claim:

1. A method for simultaneously edging complementary first and second ophthalmic lenses, each having a mating surface, which method comprises: a) stacking said first and second lenses so as to place their mating surfaces in contact with each other; and b) simultaneously edging said first and second lenses while they are stacked, wherein said first and second lenses are synthetic polymer lenses.

2. The method of claim 1, wherein said first lens has a thickness of less than about 2 mm.

3. The method of claim 1, wherein said lenses are coated and laminated after being simultaneously edged to form a laminated electrochromic eyewear lens.

4. The method of claim 3, wherein water is the temporary bonding agent.

5. The method of claim 1, wherein said first and second lenses are simultaneously edged without use of a temporary bonding agent.

6. The method of claim 1, wherein complementary half nubs are formed on the peripheral edge surfaces of each of the lenses.

7. A method for simultaneously edging a plurality of lenses having complementary surfaces, which method comprises: a) coupling said lenses so as to align their complementary surfaces; and b) simultaneously edging said lenses, wherein said lenses are synthetic polymer lenses.

8. The method of claim 7, wherein said lenses are simultaneously edged without use of a temporary bonding agent.

9. A method for simultaneously edging complementary first and second ophthalmic lenses, each having a mating surface, which method comprises: a) temporarily bonding the mating surfaces of said first and second lenses to each other by applying an effective amount of a temporary bonding agent to one or both of the mating surfaces of said lenses; and b) simultaneously edging said first and second lenses while they are temporarily bonded, wherein said first and second lenses are synthetic polymer lenses.

10. The method of claim 9, wherein said lenses are coated and laminated after being simultaneously edged to form a laminated electrochromic eyewear lens.

11. The method of claim 9, wherein water is the temporary bonding agent.

12. The method of claim 9, wherein said lenses are simultaneously edged without use of a temporary bonding agent.

13. The method of claim 9, wherein complementary half nubs are found on the peripheral edge surfaces of each of the lenses.

14. In a method for preparing a laminated electrochromic lens comprising edged first and second lenses which a re laminated using a bonding agent, the improvement comprising simultaneously edging said first and second lenses while their mating surfaces are in contact prior to lamination, wherein complementary half nubs are formed on the peripheral edge surfaces of said first and second lenses while they are simultaneously edged.

15. In a method for preparing a laminated synthetic polymer electrochromic lens comprising edged first and second coated synthetic polymer lenses which are laminated using a bonding agent, the improvement comprising simultaneously edging said first and second lenses while their mating surfaces are temporarily bonded prior to lamination.

16. An edged, laminated lens comprising simultaneously edged first and second complementary lenses and a bonding agent used to laminate said first and second lenses, wherein said first and second lenses are synthetic polymer lenses.

17. The lens of claim 16, wherein complementary half nubs are formed on the peripheral edge surfaces of each of said first and second lenses.

18. An edged, laminated lens comprising simultaneously edged first and second complementary lenses and a bonding agent used to laminate said first and second lenses, wherein said first and second complementary lenses are simultaneously edged while temporarily bonded together prior to lamination, and wherein said first and second lenses are synthetic polymer lenses.

19. A laminated electrochromic lens comprising:

a. a first edged synthetic polymer ophthalmic lens;

b. a first electroconductive metal oxide film deposited directly or indirectly on said first edged lens;

c. a first electrochromic film deposited on said first electroconductive metal oxide film;

d. a second edged synthetic polymer ophthalmic lens;

e. a second electroconductive film deposited directly or indirectly on said second edged lens or on a film or layer deposited directly or indirectly on said first edged lens;

f. optionally, a second complementary electrochromic film; and g. an ion-conducting polymer disposed between said first and second edged lenses;

wherein said first and second edged lenses are simultaneously edged prior to lamination.

20. The lens of claim 19, wherein complementary half nubs are formed on the peripheral edge surfaces of each of said first and second lenses.

* * * * *